United States Patent
Roberts et al.

(10) Patent No.: US 7,926,631 B2
(45) Date of Patent: Apr. 19, 2011

(54) DISC BRAKE

(75) Inventors: Paul Roberts, Gwent (GB); Jason Morris, Neath and Port Talbot (GB); Kishan Kumar Udupi, Bangalore (IN); Darshan Pateel, Bangalore (IN); Sanjeev Kulkarni, Bangalore (IN)

(73) Assignee: Mentor Heavy Vehicle Braking Systems (UK) Limited, Gwent (GB)

( * ) Notice: Subject to any disclaimer, the term of this patent is extended or adjusted under 35 U.S.C. 154(b) by 0 days.

(21) Appl. No.: 12/637,117

(22) Filed: Dec. 14, 2009

(65) Prior Publication Data

US 2010/0147639 A1 Jun. 17, 2010

(30) Foreign Application Priority Data

Dec. 16, 2008 (GB) .................................. 0822898.3

(51) Int. Cl.
*F16D 65/092* (2006.01)
(52) U.S. Cl. ................................ 188/250 B; 188/73.39
(58) Field of Classification Search ...... 188/72.4–73.46, 188/250 B, 250 G
See application file for complete search history.

(56) References Cited

U.S. PATENT DOCUMENTS

| | | | |
|---|---|---|---|
| 4,537,292 A | 8/1985 | Tamura | |
| 5,464,077 A * | 11/1995 | Thiel et al. | 188/72.5 |
| 5,701,978 A | 12/1997 | Weiler et al. | |
| 7,318,503 B2 * | 1/2008 | Farooq | 188/73.36 |
| 2004/0079596 A1 * | 4/2004 | Roberts et al. | 188/73.31 |
| 2004/0163899 A1 * | 8/2004 | Heinlein | 188/72.1 |
| 2004/0168868 A1 * | 9/2004 | Thomas | 188/73.37 |
| 2008/0271963 A1 * | 11/2008 | Macke et al. | 188/73.1 |
| 2009/0014262 A1 * | 1/2009 | Camilo-Martinez et al. | 188/2 R |

FOREIGN PATENT DOCUMENTS

DE 19520050 12/1995

(Continued)

OTHER PUBLICATIONS

United Kingdom Search Report for GB0822898.3 dated Apr. 20, 2009.

(Continued)

*Primary Examiner* — Christopher P Schwartz
(74) *Attorney, Agent, or Firm* — Carlson, Gaskey & Olds, P.C.

(57) ABSTRACT

A disc brake includes an actuation mechanism, and first and second brake pad mounting structures to be located, in use, adjacent opposing inboard and outboard faces, respectively, of a brake rotor to be braked. The disc brake further includes first and second brake pads located by the first and second mounting structures, respectively, such that upon application of the actuation mechanism, the brake pads clamp the brake rotor, and brake torque is reacted by the brake pad mounting structures. The first brake pad has a different functional requirement to the second brake pad such that fitment of the first brake pad in the second brake pad mounting structure and/or the second brake pad in the first brake pad mounting structure impairs the safety, functionality or durability of the brake. To prevent or inhibit such incorrect fitting, the first brake pad includes on a peripheral face or a rear face thereof a first formation in such a location that it may only be successfully fitted in the first brake pad mounting structure and only successfully fitted in the correct orientation with the brake fully assembled. The second brake pad includes a second formation different from the first formation such that it may only be successfully fitted in the second brake pad mounting structure and only successfully fitted in the correct orientation with the brake fully assembled.

20 Claims, 6 Drawing Sheets

FOREIGN PATENT DOCUMENTS

| | | |
|---|---|---|
| DE | 102005001482 | 7/2006 |
| EP | 0139890 | 5/1985 |
| EP | 0347523 | 12/1989 |
| EP | 0752541 | 1/1997 |
| EP | 1852627 | 11/2007 |
| EP | 1998066 | 12/2008 |
| GB | 2030666 | 4/1980 |
| GB | 2130319 | 5/1984 |
| JP | 2000-110859 | 4/2000 |
| WO | 2007/122100 | 11/2007 |

OTHER PUBLICATIONS

European Search Report dated Feb. 5, 2010 for EP09179350.

* cited by examiner

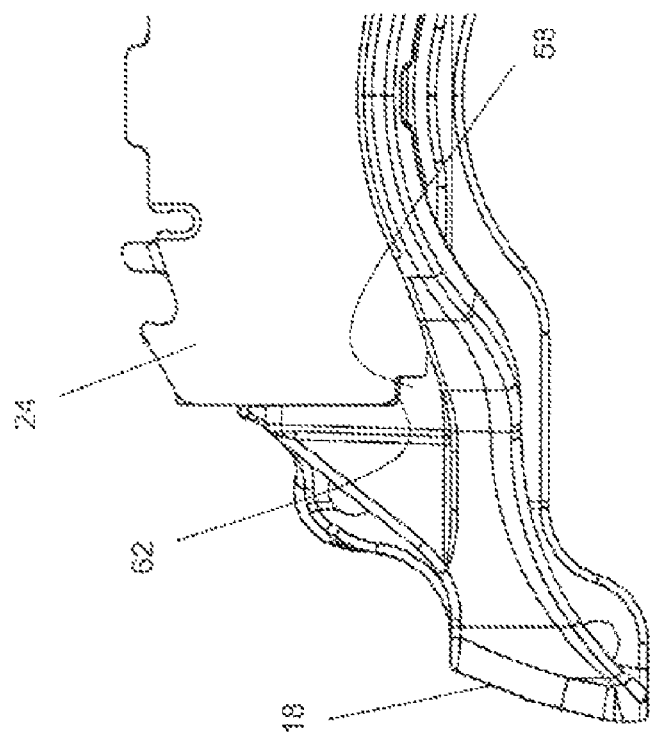
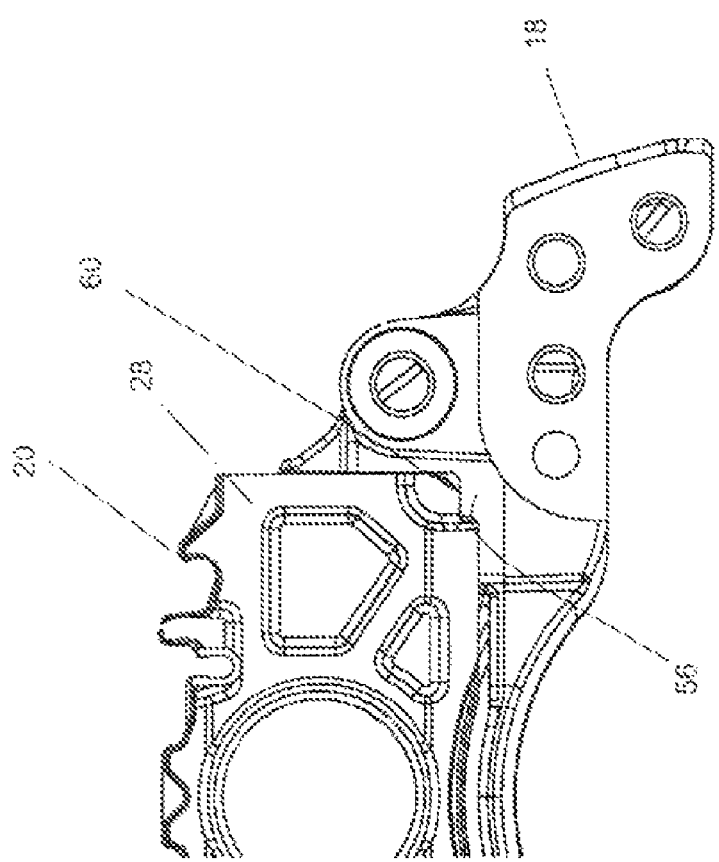

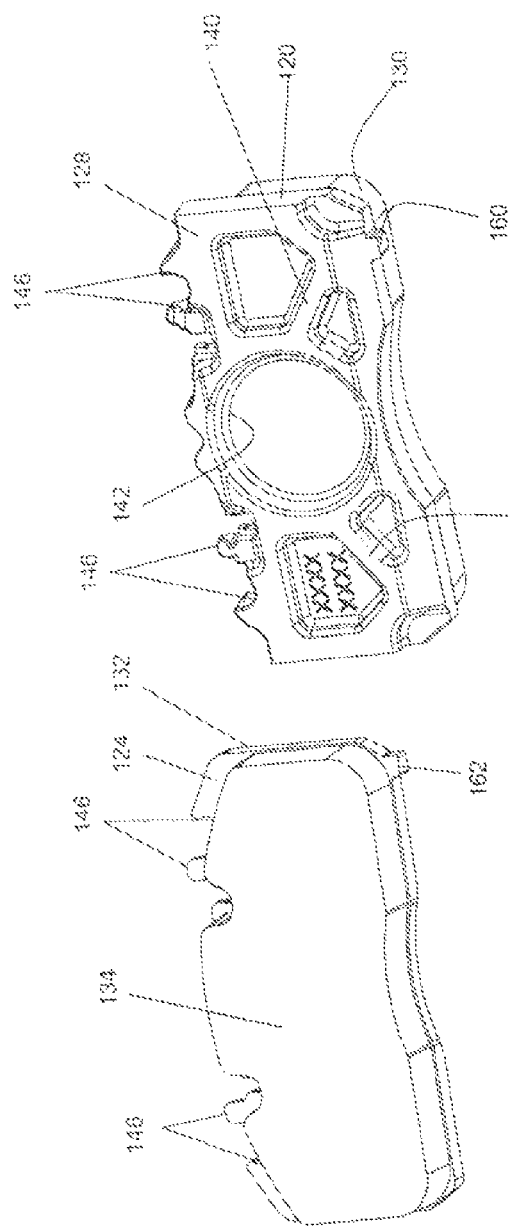
Fig. 6A
Fig. 6B
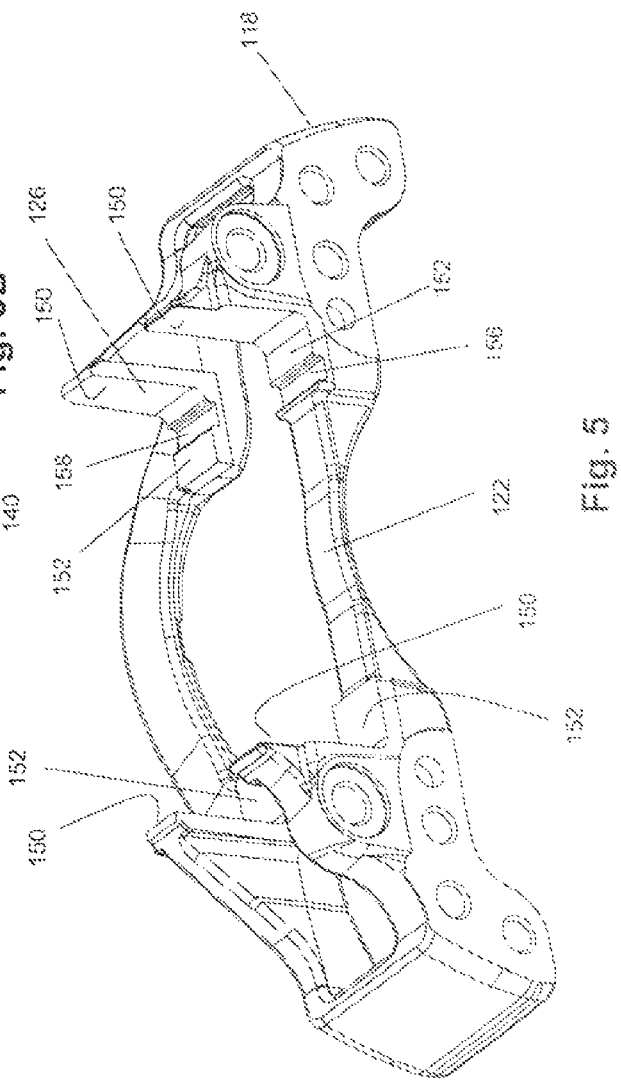
Fig. 5

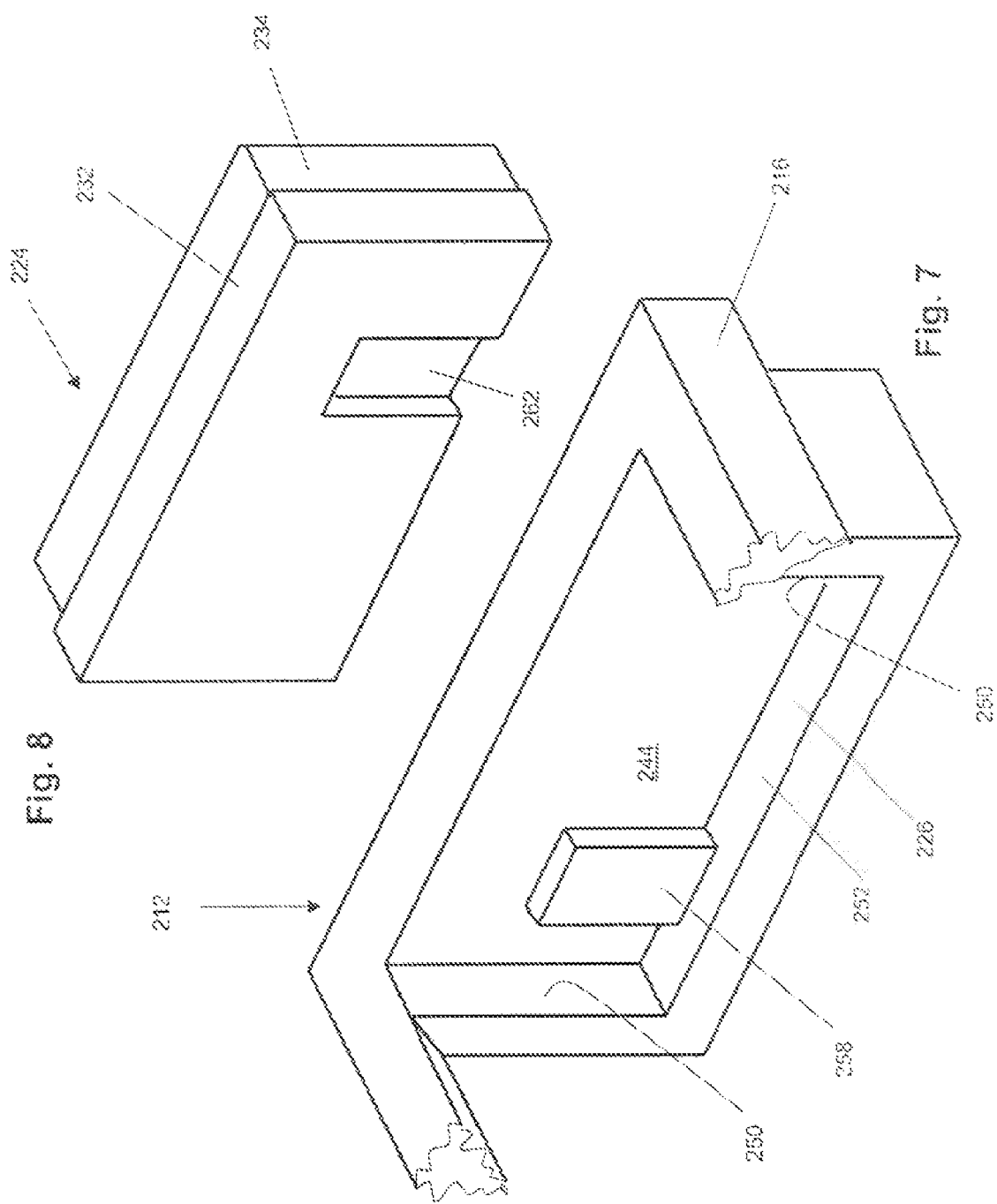

US 7,926,631 B2

DISC BRAKE

REFERENCE TO RELATED APPLICATION

This application claims priority to United Kingdom Patent Application No. GB 0822898.3 filed Dec. 16, 2008.

BACKGROUND OF THE INVENTION

The present invention relates generally to a disc brake. More particularly, the present invention relates to a disc brake incorporating an arrangement for ensuring that brake pads are always fitted in a correct orientation and correct location.

EP 0 752 541 (ArvinMeritor, Inc.) discloses providing formations on a pair of brake pads and corresponding features in a brake carrier to ensure that it is not possible for a brake to be fully assembled with the brake pads orientated with a backplate thereof facing a brake disc. Incorrectly fitting the brake pads in this manner is highly undesirable since the braking effectiveness of the brake is dramatically diminished and damage to the brake pad and brake disc may occur.

The two pads are completely identical and include a formation that has rotational symmetry about an axis extending substantially perpendicular to a rotational axis of the brake disc so that although the brake pads cannot be fitted with the backplate facing the brake disc, the brake pads are interchangeable in an inboard and outboard sense.

SUMMARY OF THE INVENTION

In most applications, such an arrangement is entirely satisfactory. However, the inventors have recognized that in some circumstances, the inboard and outboard brake pads have differing dimensions or properties, and it is not desirable that they be interchangeable. An example of such a general arrangement is the type of brake illustrated in FIG. 1 (although this brake incorporates further features in accordance with the present invention as discussed below). The brake is a sliding caliper air disc brake including a single actuating piston/tappet that applies the inboard brake pad directly. The inboard brake pad requires a relatively thick backplate because a central loading from a piston may otherwise tend to cause the inboard brake pad to flex during its application. In contrast, the outboard brake pad is supported across virtually an entire rear face of the backplate, and therefore a thinner backplate may be used to save weight and materials cost. The fitting of these two brake pads in the incorrect location would, at the very least, be likely to cause uneven wear on the outboard brake pad when fitted in the inboard location, and therefore require the premature replacement of the brake pad.

The inventors have recognized that it is therefore desirable in such circumstances to prevent or inhibit such incorrect fitting from occurring.

A disc brake includes an actuation mechanism and first and second brake pad mounting structures to be located, in use, adjacent opposing inboard and outboard faces, respectively, of a brake rotor to be braked. The disc brake includes first and second brake pads located by the first and second mounting structures, respectively, such that upon application of the actuation mechanism, the brake pads clamp the rotor, and brake torque is reacted by the brake pad mounting structures. The first brake pad has a different functional requirement to the second brake pad such that fitment of the first brake pad in the second brake pad mounting structure and/or the second brake pad in the first brake pad mounting structure impairs the safety, functionality or durability of the brake. To prevent or inhibit such incorrect fitting, the first brake pad includes on a peripheral face or a rear face thereof a first formation in such a location that it may only be successfully fitted in the first brake pad mounting structure and only successfully fitted in the correct orientation with the brake fully assembled. The second brake pad includes a second formation different from the first formation such that it may only be successfully fitted in the second brake pad mounting mounting structure and only successfully fitted in the correct orientation with the brake fully assembled.

In a second aspect, first and second disc brake pads are for fitment in first and second mounting structures, respectively, of a disc brake inboard and outboard, respectively, of a brake rotor. The first pad has a different functional requirement to the second pad such that fitment of the first brake pad in the second mounting structure and/or the second brake pad in the first mounting structure would impair the safety, functionality and/or durability of the brake. To prevent or inhibit such incorrect fitting, the first brake pad includes on a peripheral face or a rear face thereof a first formation and the second brake pad includes on a peripheral face or a rear face thereof a second formation. The first and second formations are arranged such that the first and second brake pads have neither mirror symmetry nor rotational symmetry when assembled in the brake and cannot be fitted in an incorrect location or an incorrect orientation when the brake has corresponding features within the mounting structures thereof.

BRIEF DESCRIPTION OF THE DRAWINGS

Embodiments of the present invention will now be described, by way of example only, with reference to the accompanying drawings in which:

FIGS. 4A and 4B are end views looking outboard and inboard, respectively, at the carrier and the brake pads of FIG. 2;

FIG. 5 is a carrier of a brake according to another embodiment;

FIGS. 6A and 6B are perspective views of outboard and inboard brake pads, respectively, for fitment within the carrier of FIG. 5;

FIG. 7 is an isometric view of a portion of a brake caliper of a brake according to another embodiment; and FIG. 8 is an isometric view of an outboard brake pad for fitment to the brake caliper of FIG. 7.

DETAILED DESCRIPTION OF THE PREFERRED EMBODIMENT

Figure 1:
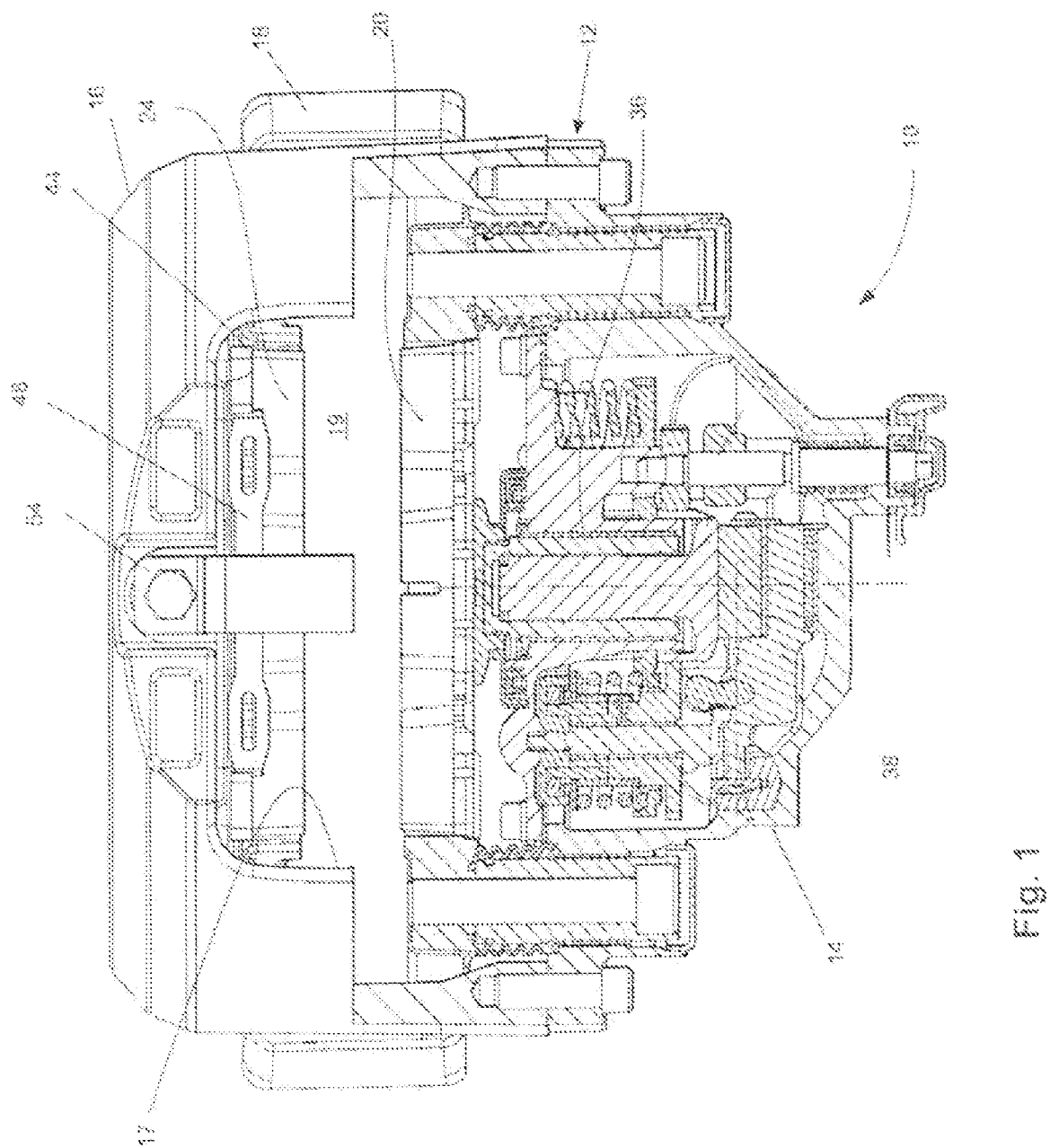
FIG. 1 is a partial cross-sectional view through a brake.

With reference to FIG. 1, a plan view of a brake is indicated generally at 10 according to one embodiment of the present invention is shown. The brake 10 includes a caliper 12 formed from a housing portion 14 and a bridge portion 16 with a radial aperture 17. When considering a vehicle upon which the brake 10 is to be mounted, the housing portion 14 is located inboard and the bridge portion 16 outboard with respect to the vehicle. The caliper 12 is slidably mounted for movement in an inboard/outboard direction with respect to a carrier 18. The carrier 18 is mounted to a fixed location with respect to a vehicle axle or steering knuckle (not shown) and is arranged to receive a brake disc or rotor (not shown) in the space 19.

Figure 2:
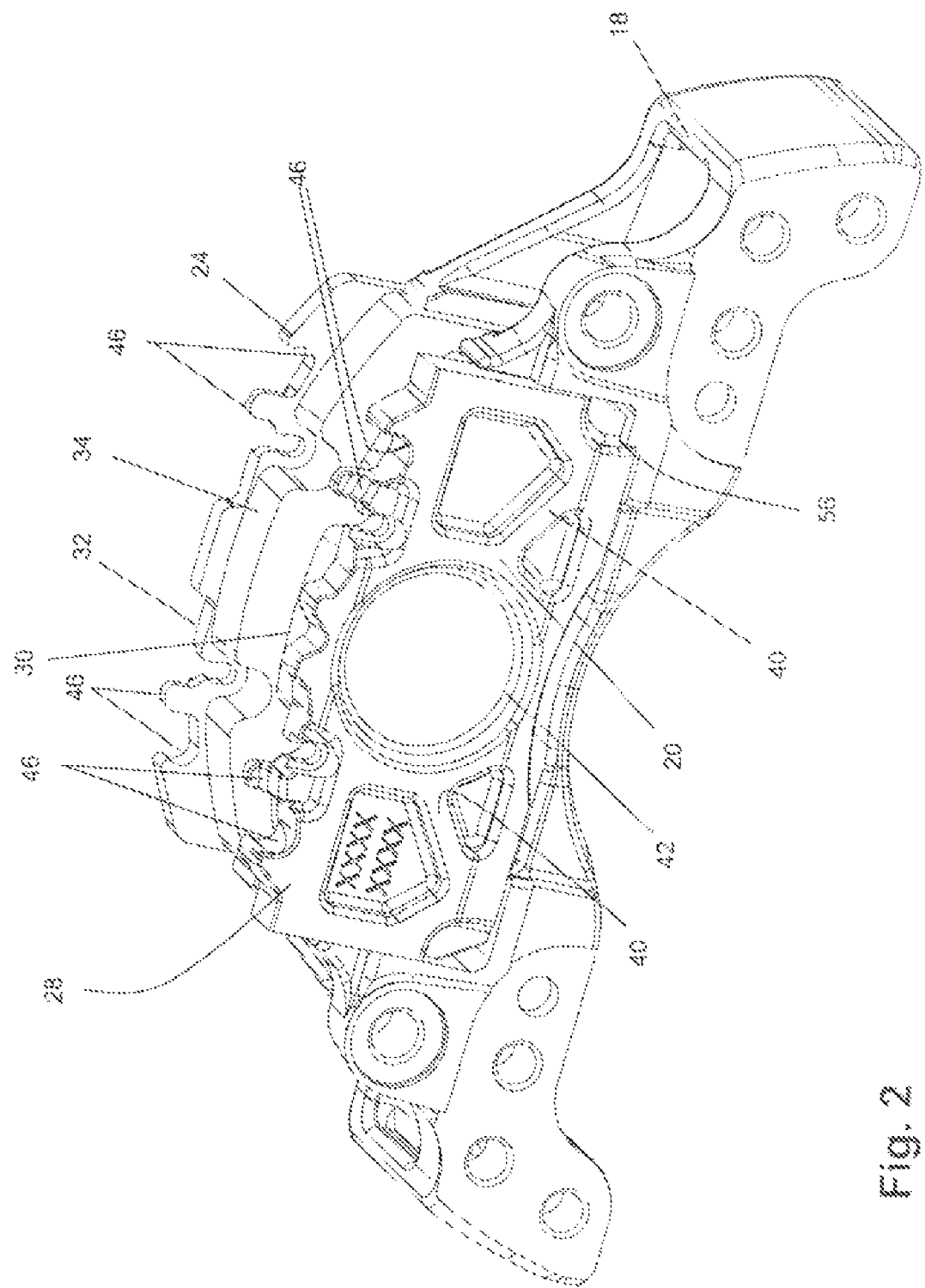
FIG. 2 is a perspective view of a carrier portion and brake pads of the brake of FIG. 1.
Figure 3:
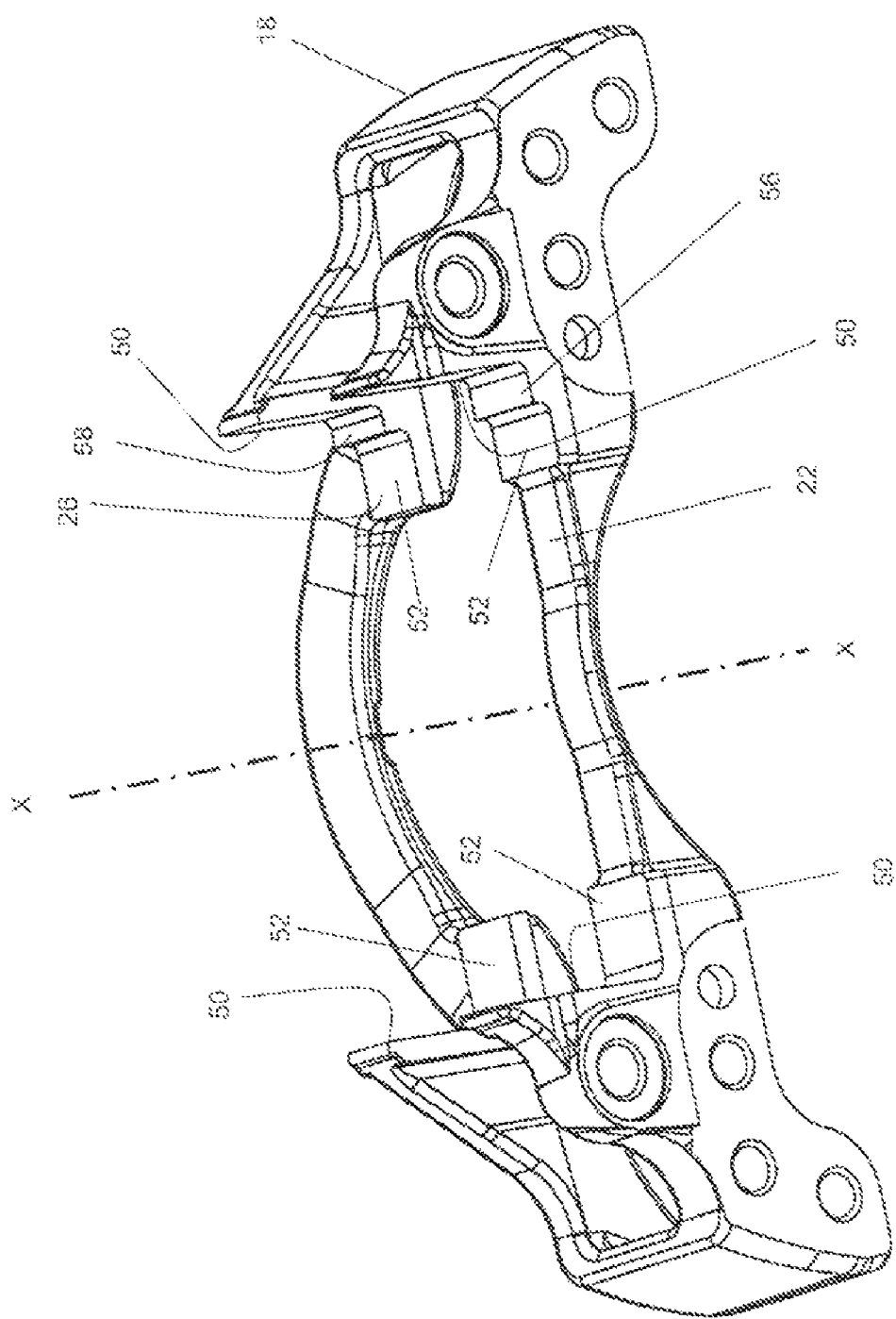
FIG. 3 is a perspective view of the carrier portion alone of the brake of FIG. 1.

With reference to FIGS. 2 and 3, an inboard brake pad 20 is located within a first pad mounting structure in the form of an inboard opening 22 of the carrier 18 that is arranged to support the brake pad 20 in a radially inward and circumferential (i.e., rotational) direction. Likewise, an outboard brake pad 24 is located within a second pad mounting structure in the form of an outboard opening 26 and is supported therein in a similar manner to the inboard brake pad 20. The brake pads 20 and 24 may be fitted in the openings 22 and 26, respectively, via the radial aperture 17.

The inboard brake pad 20 includes an inboard backplate 28 and friction material 30 secured to the inboard backplate 28. The inboard backplate 28 has the function of imparting strength to the inboard brake pad 20, since the friction material 30 itself is relatively brittle. The inboard backplate 28 is relatively thick and is manufactured in this embodiment in a casting process from iron or steel to support the friction material 30. Further details of the inboard backplate 28 are discussed in more detail below. The outboard brake pad 24 also comprises an outboard backplate 32 and friction material 34.

For the effective operation of the brake 10, it is critical that the brake 10 is assembled with the brake pads 20 and 24 placed in the openings 22 and 26, respectively, with the friction material 30 and 34 facing the brake disc for the reasons set out above.

Referring back to FIG. 1, it can be seen from the cut-away portion thereof that the brake 10 includes a single piston 36 that engages a rear face of the inboard brake pad 20 and is actuated via an air chamber (not shown) and an operating shaft 38 in a known manner as discussed in further detail in EP 1 852 627 to the present applicant, and incorporated herein by reference.

As can be seen from FIGS. 2, 4A and 4B, the form of the inboard backplate 28 is different from the outboard backplate 32. The inboard backplate 28 is substantially thicker than the outboard backplate 32 (in this embodiment, 15 mm thick) by virtue of having stiffening elements 40 and a central circular depression 42 to receive a head of the piston 36 formed therein. Such an arrangement is desirable for the inboard brake pad 20 in order that it is able to receive the central loading from the piston 36 during braking without appreciable flexing of the inboard brake pad 20 occurring. In other embodiments, the arrangement of the inboard backplate 28 may be altered according to the particular requirements of the brake 10.

By contrast, the outboard backplate 32 is a substantially planar cast component (without stiffening ribs) that is significantly thinner (approximately half as thin at 8mm) as the inboard backplate 28. It is possible to use a thinner outboard backplate 32 for the outboard brake pad 24 because the outboard backplate 32 is supported across substantially all of its rear face by a corresponding support surface 44 of the caliper 12.

Nevertheless, despite the differences in the thickness and shape of the inboard and outboard backplates 28 and 32, the general shape and dimensions of their peripheries, as well as formations 46 provided for the attachment of a pad spring 48, are functionally the same. Specifically, their circumferential width and radial height are substantially the same. In addition, the thickness and dimensions of the friction material 30 and 34 on the two brake pads 20 and 24 is identical.

Thus, without the arrangement provided in the present invention, it is possible for the outboard brake pad 24 to be fitted in the inboard opening 22, and for the inboard brake pad 20 to be fitted in the outboard opening 26, in addition to the possibility of the brake pads 20 and 24 being fitted with the friction material 30 and 34, respectively, in the wrong direction. In particular, the fitting of the outboard brake pad 24 in the inboard opening 22 in contact with the piston 36 is undesirable, since this may lead to a flexing of the outboard brake pad 24, thus limiting its useful life due to uneven wear or cracking of the friction material 34 because the center of the outboard brake pad 24 proximate to the piston 36 would wear more rapidly than the friction material 34 at the circumferential ends thereof.

To combat this problem, the inboard brake pad 20 and outboard brake pad 24 are provided with an inboard formation 60 and an outboard formation 62, respectively, that define, together with corresponding features in the openings 22 and 26, an interface with the desired opening 22 and 26 which is incompatible with the interface of the other brake pad 20 and 24 with its desired opening 22 and 26, respectively. Consequently, if the brake pad 20 or 24 is placed within the incorrect opening 22 or 26, and/or in an incorrect orientation, the brake pad 20 or 24 cannot be seated properly within that opening 22 and 26 to the extent that the assembly of the brake 10 cannot be completed.

Specifically, with reference to FIG. 1 and FIG. 3 of the present invention, it can be seen that the openings 22 and 26 in the carrier 18 each include two upright abutment surfaces 50 that are mutually parallel and take the circumferential loads from the brake pads 20 and 24 that are frictionally induced under braking and transmit these forces to the vehicle axle. The openings 22 and 26 each further include two horizontal abutment surfaces 52. The horizontal abutment surfaces 52 maintain the brake pad in a desired radial relationship with respect to the rotor in conjunction with a pad strap 54 that extends across the radial aperture 17 over the brake pads 20 and 24 and the pad springs 48, but enable the brake pads 20 and 24 to advance towards the brake disc as they wear.

It can be seen in FIG. 3 that the horizontal abutment surfaces 52 to the left of the carrier 18 as viewed in FIG. 3 are substantially planar and merge directly into the adjacent upright abutment surfaces 50. At the right hand end, the horizontal abutment surfaces 52 include a feature in the form of a step. An inboard step 56 is provided at a junction of the horizontal abutment surface 52 and the upright abutment surface 50, as is an outboard step 58. However, the shapes of the two steps 56 and 58 differ. The inboard step 56 is shallower in the radial direction, but wider in the circumferential direction, than the outboard step 58. Since the steps 56 and 58 are both at the same end of the openings 22 and 26, the openings 22 and 26 do not have rotational symmetry about a radial axis X-X that extends through the center of the space 19. Furthermore, since the dimensions of the steps 56 and 58 differ, the openings 22 and 26 do not have minor symmetry about the plane of the brake disc. The location of the steps 56 and 58 means they can be easily formed as part of the machining operation of the carrier abutments.

The inboard formation is a notch 60 shaped to conform to the inboard step 56 (although the two need not actually be in contact when assembled), and the outboard formation is a notch 62 that conforms to the outboard step 58 in a similar way. The notch location is advantageous since it does not appreciably weaken the brake pads 20 and 24.

Thus, if an attempt is made to seat either brake pad 20 and 24 in its incorrect location or orientation, the size and shape of the steps 56 and 58 will prevent the brake pad 20 and 24 from seating correctly within the opening 22 or 26. This means that it would not be possible for the pad strap 54 to be secured over the bridge portion 16, and the brake 10 could not therefore be properly assembled.

FIGS. 5, 6A and 6B illustrate a carrier 118, an outboard brake pad 124 and an inboard brake pad 120, respectively, according to another embodiment of the present invention. In this embodiment, like parts are labelled using like numerals, but with the addition of the prefix "1."

It can be seen from FIG. 5 that the steps 56 and 58 have been replaced by an inboard slot or trough 156 extending across the inboard right hand horizontal abutment surface 152. The trough 156 is located towards the left hand side of the horizontal abutment surface 152. A similar trough 158 is provided in the outboard right hand horizontal abutment surface 152, but is located towards the right hand side of the horizontal abutment surface 152. Again, it is therefore apparent that the inboard opening 122 and the outboard opening 126 have neither rotational nor minor symmetry. This means that by virtue of corresponding formations (in the form of downwardly projecting lugs 60 and 62), it is only possible to properly assemble the brake 10 with the brake pads 120 and 124 in the correct opening 122 and 126 and in their correct orientation.

Referring now to FIGS. 7 and 8, a third embodiment of the present invention is illustrated. In this embodiment, like parts are illustrated by like numerals, but with the addition of the prefix "2." Only differences between the third embodiment and the preceding two embodiments are discussed in more detail.

This embodiment differs from the preceding embodiments in that the outboard brake pad 224 is supported entirely by the caliper 212. The carrier (not shown) only supports the inboard brake pad and does not extend over the rotor. This type of arrangement is shown in more detail in GB 2 413 162, in the name of the present applicant.

As a consequence of this arrangement, rather than the outboard opening being provided in the carrier, a corresponding opening 226 is formed in the caliper 212, so that as well as the caliper 212 transferring the clamp load to the outboard brake pad via the surface 244, it additionally includes the outboard upright abutment surfaces 250 and the horizontal abutment surfaces 252 to transfer the torque loads to the carrier via the bridge 216 and the housing (not shown).

This embodiment further differs in terms of the interface arrangement to prevent incorrect pad fitting. In this embodiment, the outboard interface is defined by a lug 262 that does not extend through an entire depth of the horizontal abutment surface 252. This is possible because the spatial relationship between the outboard brake pad 224 and the caliper 212 remains fixed, and no relative sliding of the outboard brake pad 224 with respect to the upright abutment surface 250 and the horizontal abutment surface 252 occurs.

In this embodiment, an inboard brake pad having the same type of notch 60 or lug 160 as in the first and second embodiments may be used since the different interface arrangements remain incompatible due to a lack of rotational and mirror symmetry to prevent the pads being fitted in the wrong location or in the wrong orientation.

It should be appreciated that the directional terms such as horizontal, upright, etc., should not be construed as limiting since brakes of the type described herein may be mounted in numerous orientations with respect to an axle and disc. Use of such terms is merely for the purposes of clarity and convenience.

It should be understood that numerous changes may be made within the scope of the present invention. For example, numerous alternative shapes for the interface and locations of the interface may be provided on the brake pads and brake pad supports provided those arrangements do not result in an arrangement of inboard and outboard openings that have either rotational or mirror symmetry. In addition, the interface formation may be provided on a non-sliding surface of the openings (i.e., intermediate the horizontal support surfaces). In some instances, it may be possible to provide the formations on the upright support surfaces or upright portions of the openings that do not act as sliding surfaces. A similar arrangement may be employed on fixed caliper, sliding rotor type disc brakes or on fixed caliper, fixed rotor brakes which have means for directly driving the outboard pad. The backplates may be forged, stamped or fabricated rather than being cast.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A disc brake comprising:
   an actuation mechanism;
   a first brake pad mounting structure and a second brake pad mounting structure to be located, in use, adjacent opposing inboard and outboard faces, respectively, of a brake rotor to be braked; and
   a first brake pad and a second brake pad located by the first brake pad mounting structure and the brake pad second mounting structure, respectively, such that, upon application of the actuation mechanism, the first brake pad and the second brake pad clamp the brake rotor and brake torque is reacted by the first brake pad mounting structure and the second brake pad mounting structure,
   wherein the first brake pad has a different functional requirement to the second brake pad,
   wherein, to prevent or inhibit incorrect fitting of the first brake pad in the second brake pad mounting structure, the first brake pad includes on one of a peripheral face or a rear face thereof a first formation located such that the first brake pad can only be fitted in the first brake pad mounting structure and only fitted in a correct orientation with the brake fully assembled, and
   wherein, to prevent or inhibit incorrect fitting of the second brake pad in the first brake pad mounting structure, the second brake pad includes a second formation different from the first formation such that the second brake pad can only be fitted in the second brake pad mounting structure and only fitted in a correct orientation with the brake fully assembled, wherein the different functional requirement is a different flexural strength.

2. The disc brake according to claim 1 wherein the first brake pad and the second brake pad include backplates, and the backplate of the first brake pad is thicker than the backplate of the second brake pad.

3. The disc brake according to claim 1 wherein the first brake pad has a form to engage a piston or a tappet of the brake.

4. The disc brake according to claim 1 wherein the second brake pad has a formation to be supported in a corresponding structure of a bridge portion of a caliper of the brake.

5. The disc brake according to claim 1 wherein the second brake pad has a formation to be supported in a structure of a carrier of the brake.

6. The disc brake according to claim 1 wherein the formation of at least one of the first brake pad and the second brake pad is located on a bottom edge thereof.

7. The disc brake according to claim 1 wherein a formation of at least one of the first brake pad and the second brake pad is located on a rear face thereof.

8. The disc brake according to claim 1 wherein the formation of at least one of the first brake pad and the second brake pad is located on a side edge thereof.

9. The disc brake according to claim 1 wherein a formation of at least one of the first brake pad and the second brake pad is located on a top edge thereof.

10. The disc brake according to claim 1 wherein a formation on at least one of the first brake pad and the second brake pad includes a projection or a recess to engage with a corresponding feature in the respective mounting structure.

11. The disc brake according claim 1 wherein the first brake pad and the second brake pad include substantially identical structures for attachment of pad springs.

12. The disc brake according to claim 1 further including an aperture for the fitting and removal of the first brake pad and the second brake pad in a radial direction.

13. The disc brake according to claim 12 wherein the aperture permits the fitting and removal of the first brake pad and the second brake pad to be achieved with the brake disc being in place.

14. The disc brake according to claim 1 wherein the first brake pad and the second brake pad are configured to be retained radially in the respective mounting structures by a pad strap.

15. The disc brake according to claim 14 wherein the pad strap is prevented from being secured over the first brake pad and the second brake pad if the first brake pad and the second brake pad are incorrectly orientated and located.

16. The disc brake according to claim 1 wherein fitting the first brake pad and the second brake pad in a corresponding first location and a second location and in the correct orientations is the only way of assembling a fully functional brake.

17. The disc brake according to claim 1 wherein the first formation and the second formation are a notch.

18. A first brake pad and a second brake pad comprising:
a first formation on a peripheral face or a rear face of the first brake pad; and
a second formation on a peripheral face or a rear face of a second brake pad,
wherein the first brake pad and the second brake pad are for fitment in a first mounting structure and a second mounting structure, respectively, of a disc brake inboard and outboard, respectively, of a brake rotor, and the first brake pad and the second brake pad are in or for the disk brake, and
wherein the first formation and the second formation are arranged such that the first brake pad and the second brake pad have neither minor symmetry nor rotational symmetry when assembled in a brake and cannot be fitted in an incorrect location or an incorrect orientation when the disc brake has corresponding features within the first mounting structure or the second mounting structure thereof, wherein the first brake pad has a different flexural strength to the second brake pad.

19. The first brake pad and the second brake pad according to claim 18 further including substantially identical structures for attachment of pad springs.

20. The first brake pad and a second brake pad of claim 18 wherein the first formation and the second formation are a notch.

* * * * *

UNITED STATES PATENT AND TRADEMARK OFFICE
CERTIFICATE OF CORRECTION

| | | |
|---|---|---|
| PATENT NO. | : 7,926,631 B2 | Page 1 of 1 |
| APPLICATION NO. | : 12/637117 | |
| DATED | : April 19, 2011 | |
| INVENTOR(S) | : Roberts et al. | |

It is certified that error appears in the above-identified patent and that said Letters Patent is hereby corrected as shown below:

ON THE TITLE PAGE:

The Assignee Section should read as follows:

(73) Assignee: Meritor Heavy Vehicle Braking Systems (UK) Limited, Gwent (GB)

Signed and Sealed this
Fourteenth Day of June, 2011

David J. Kappos
*Director of the United States Patent and Trademark Office*